M. M. HERMAN.
RIM TOOL.
APPLICATION FILED MAR. 11, 1915.
1,155,151.
Patented Sept. 28, 1915.
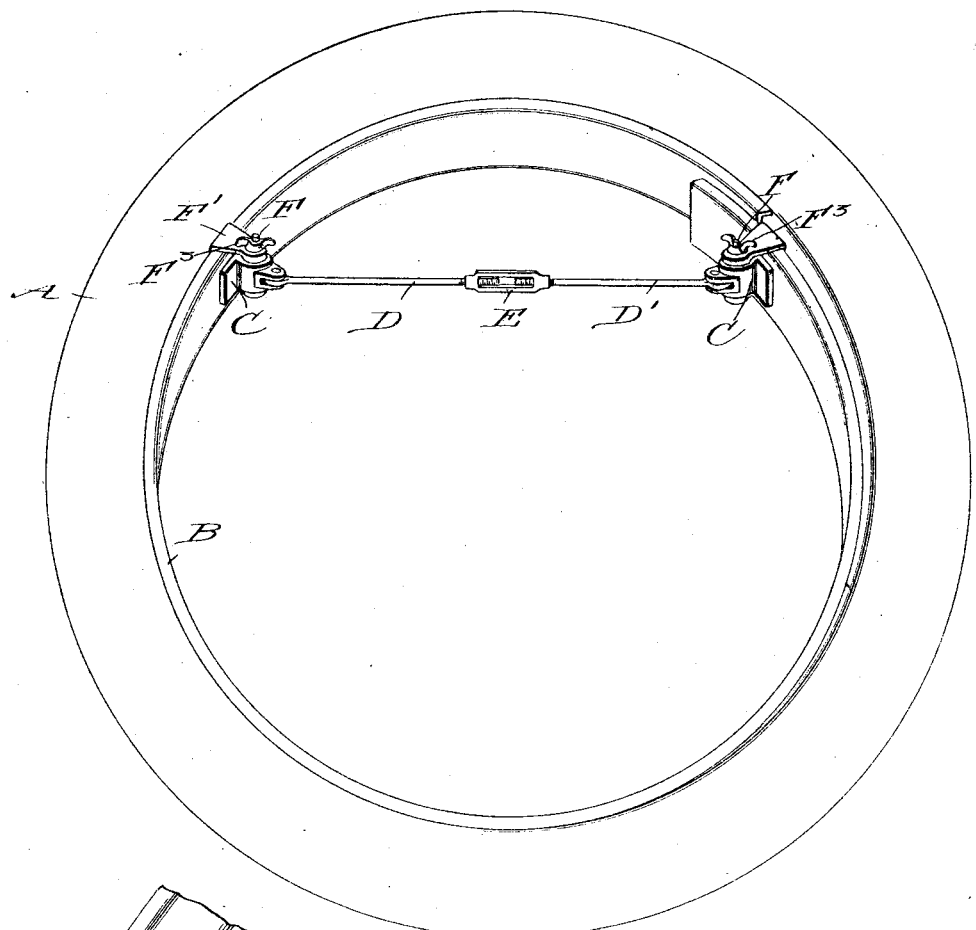
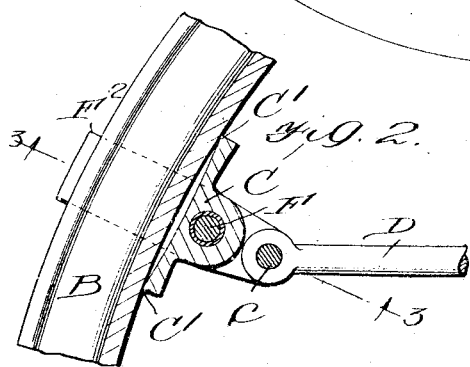
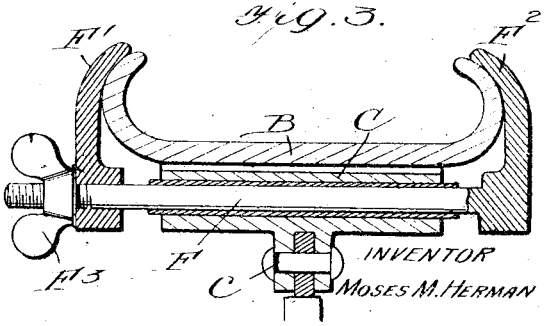
WITNESSES
H. E. Barry
Myron G. Clear
INVENTOR
Moses M. Herman
BY Munn & Co.
ATTORNEYS

UNITED STATES PATENT OFFICE.

MOSES MILTON HERMAN, OF DANVILLE, VIRGINIA.

RIM-TOOL.

1,155,151.

Specification of Letters Patent. Patented Sept. 28, 1915.

Application filed March 11, 1915. Serial No. 13,764.

*To all whom it may concern:*

Be it known that I, MOSES MILTON HERMAN, a citizen of the United States, and a resident of Danville, in the county of Pittsylvania and State of Virginia, have invented a certain new and useful Improvement in Rim-Tools, of which the following is a specification.

My present invention relates generally to tools for reducing the normal circumference of split demountable rims of various types now in common use, and more particularly to a tool of the nature described and claimed in my Patent Number 1,133,139, which was granted March 23, 1915.

The object of my present invention is to provide a tool including clamping members, having engagement with portions of the inner periphery of a rim as well as the side edges thereof, without necessitating particular formation of the rim, and permitting the tool to be utilized in connection with any rim of the demountable type.

In carrying out my present invention I preferably employ the structure of clamping member as shown in the accompanying drawing in which—

Figure 1 is a perspective view illustrating a rim detached and partly reduced in circumference to permit of the withdrawal of its tire therefrom, and illustrating the practical application of my invention thereto. Fig. 2 is a longitudinal section through a portion of the rim and one of the clamping members engaged therewith, and Fig. 3 is a transverse section taken therethrough substantially on line 3—3 of Fig. 2.

Referring now to these figures, a tire A is shown upon a split rim B of the demountable type, at spaced points in connection with the latter of which, the clamping members forming part of my invention, are engaged, each of these clamping members including a body plate C, which in accordance with my present invention, has its outer face concaved to provide projecting transversely extending engaging edges C', adapted to positively engage the inner peripheral surface of the rim B in non-slipping relation.

Each of the body plates C, as clearly seen, is also provided with a transverse opening, through which extends a clamping bolt F, having a rigid clamping piece F' at one end, and extending loosely through a movable clamping piece F² at its opposite end, the latter end of the bolt being threaded for the reception of a wing nut F³ by which the clamping pieces F' and F², which are engageable with the opposite side edges of the rim B, as best seen in Fig. 3, are moved relatively to one another in order to firmly embrace the said side edges of the rim and thus maintain the body plate C snugly against the rim and insure positive engagement of its engaging edges C' as above mentioned.

The clamping members are connected by connecting rods D and D', the outer ends of which are hingedly connected at c to the inner portions of the body plates C, and the inner ends of which connecting rods D and D' are connected by means of a turnbuckle E providing for their relative adjustment in order to move the clamping members toward and away from one another and thus reduce the rim circumferentially preparatory to withdrawing the tire A therefrom.

Thus it will be seen that in the action of the tool to circumferentially reduce the split rim, the tendency is to cant each of the body plates C, thus securing a more firm engagement between certain of the projecting edges C' and the inner periphery of the rim.

Clamping members so constructed and relatively engaged with spaced portions of the rim, thus obviate any necessity of particular formation of a rim, such as for instance the provision of projections or recesses in the rim, as in my application above referred to, and at the same time are effectively prevented from accidental displacement circumferentially of the rim from the particular point to which they may be applied.

In reducing the circumference of the rim to permit of the removal of the tire, as before stated, the turnbuckle E is manipulated to draw the connecting rods D and D' toward one another, thus moving the clamping members relatively to one another and the portions of the rim to which they are attached.

I claim:—

1. A rim tool of the character described comprising a pair of clamping members, each of which consists of a body plate having transverse engaging edges projecting beyond its outer face to positively engage the inner periphery of a rim in non-slipping relation, clamping pieces carried by each of said clamping members and for detachable engagement with the side edges of the rim, and adjustable connections between the said clamping members.

2. A rim tool of the character described comprising a pair of clamping members, each of which is provided with means for detachably engaging the side edges of a rim, and each of which is provided with outwardly projecting transversely extending engaging edges for engagement with the inner periphery of a rim to prevent accidental displacement circumferentially of the rim, and adjustable connections between the said clamping members.

3. A rim tool of the character described comprising a pair of clamping members, each of which consists of a body plate, the outer face of which is concaved to provide transverse engaging edges at the upper and lower ends of the plate, projecting beyond its said outer face to positively engage the inner periphery of a rim in non-slipping relation, clamping pieces carried by each of said clamping members for detachably engaging the side edges of the rim, and adjustable connections between said clamping members.

MOSES MILTON HERMAN.